(12) United States Patent
Shen et al.

(10) Patent No.: US 9,358,935 B2
(45) Date of Patent: Jun. 7, 2016

(54) ROOF DRIP MOLDING ATTACHMENT

(71) Applicant: Toyota Motor Engineering & Manufacturing North America, Inc., Erlanger, KY (US)

(72) Inventors: Mingher Fred Shen, Ann Arbor, MI (US); Ryan A. Mikolaizik, Grand Blanc, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/494,393

(22) Filed: Sep. 23, 2014

(65) Prior Publication Data

US 2016/0082899 A1 Mar. 24, 2016

(51) Int. Cl.
*B60R 13/04* (2006.01)
*B60R 13/07* (2006.01)

(52) U.S. Cl.
CPC ...................................... *B60R 13/07* (2013.01)

(58) Field of Classification Search
CPC ............................................................ B60R 13/04
USPC ........................................ 296/213, 1.08, 210
See application file for complete search history.

(56) References Cited

U.S. PATENT DOCUMENTS

| 5,013,083 | A | 5/1991 | Yada et al. | |
|---|---|---|---|---|
| 5,186,509 | A | 2/1993 | Tyves | |
| 7,165,807 | B2 | 1/2007 | Wato et al. | |
| 7,641,250 | B2 | 1/2010 | Gambatese | |
| 2001/0000016 | A1* | 3/2001 | Sugiura | B62D 25/06 296/210 |
| 2012/0068488 | A1* | 3/2012 | Mourou | B60R 13/0206 296/1.08 |
| 2013/0283576 | A1 | 10/2013 | Bozinovski | |

FOREIGN PATENT DOCUMENTS

| GB | 2375372 A | 11/2002 |
|---|---|---|
| JP | 10-157528 * | 6/1998 |
| JP | 3714739 B2 | 11/2005 |
| JP | 3878182 B2 | 2/2007 |
| JP | 4420164 B2 | 2/2010 |
| KR | 20140030128 A | 3/2014 |

* cited by examiner

*Primary Examiner* — Dennis H Pedder
(74) *Attorney, Agent, or Firm* — Dinsmore & Shohl LLP

(57) ABSTRACT

An improved attachment assembly for attaching a trim piece to a vehicle body panel. The trim assembly for attachment to a body panel of a vehicle including a trim piece having an inner surface, a mounting portion connected to the inner surface, the mounting portion having at least one indentation, an engagement clip adapted to securely connect to the mounting portion of the trim piece, the mounting portion adapted to slide into the clip into a secured portion, the engagement clip connected to the body panel of the vehicle and at least one engagement arm connected to the engagement clip, the at least one engagement arm having an inwardly facing protrusion adapted to connect with the indentation of the mounting portion as the mounting portion slides into an installed position.

19 Claims, 4 Drawing Sheets

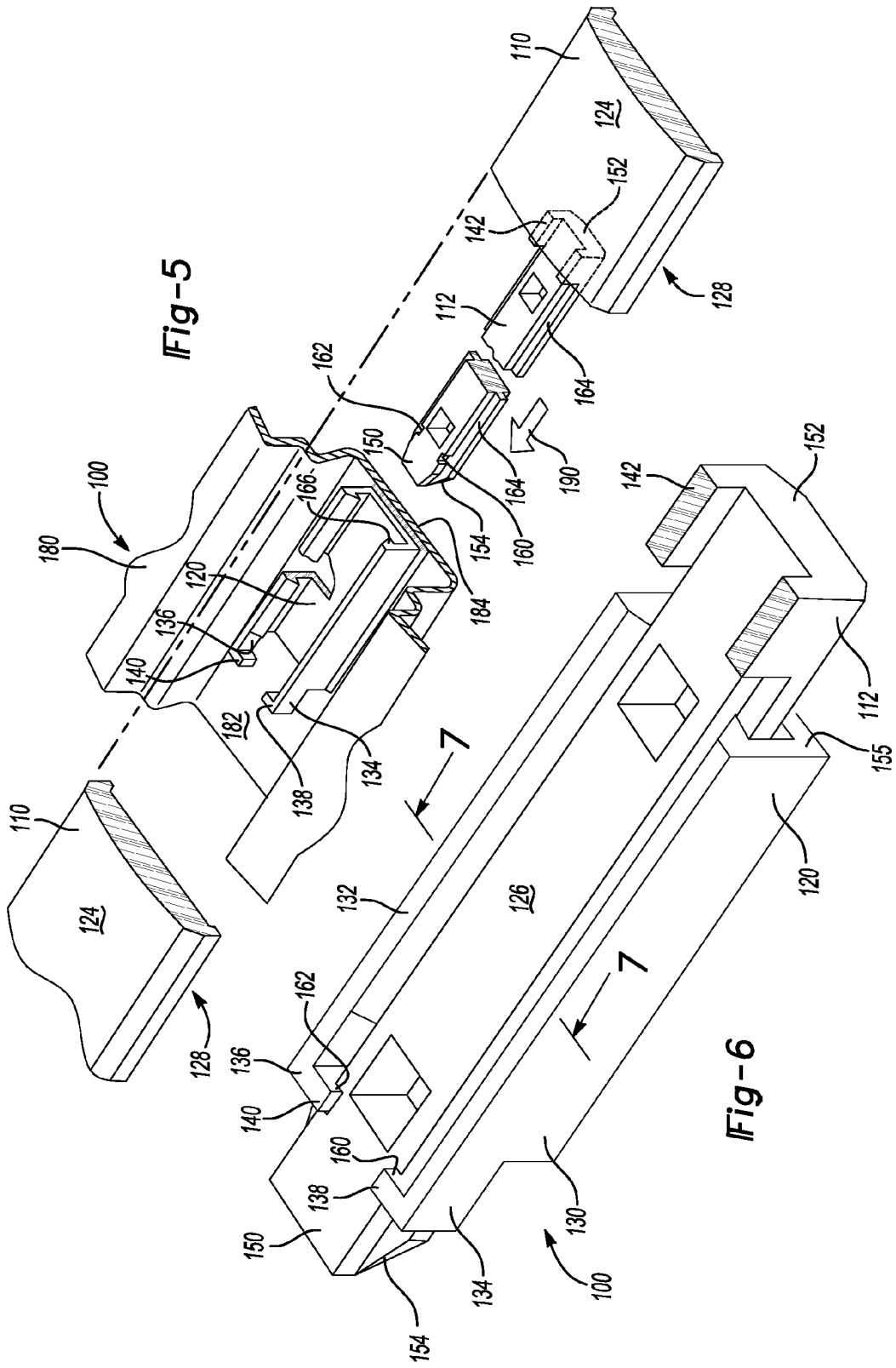

ROOF DRIP MOLDING ATTACHMENT

FIELD OF THE INVENTION

The present assembly relates generally to trim attachment assemblies. More particularly, the present assembly relates to a slidable attachment assembly for a trim piece for a vehicle.

BACKGROUND OF THE INVENTION

Trim assemblies and corresponding attachment members are well known in the art. Trim assemblies for a roof drip molding are also well known and typically installed at a perpendicular angle and press fit into an engagement clip. A typical automotive roof molding is installed perpendicular to an engagement clip by pressing the molding attachment member into the clip. However, the retention force of the molding installed in such a fashion is limited to the insertion force and thus may not have enough retention force to prevent the molding from becoming disengaged. A molding installed in a press fit engagement may easily be removed by the user, by high wind speeds, car wash or otherwise accidentally engaged from the engagement clip. Accordingly, there exists a need in the art to provide a trim piece and corresponding attachment mechanism and corresponding method for more securely installing a roof drip molding to a vehicle body panel.

SUMMARY OF THE INVENTION

The present assembly provides for an improved attachment assembly for attaching a trim piece to a vehicle body panel. An improved attachment assembly includes a tapered mounting portion connected to a trim piece operable to slidably connect with an engagement clip having at least one engagement arm. The assembly includes a trim assembly for attachment to a body panel of a vehicle including a trim piece having an inner surface, a mounting portion connected to the inner surface, the mounting portion having at least one indentation, an engagement clip adapted to securely connect to the mounting portion of the trim piece, the mounting portion adapted to slide into the clip into a secured portion, the engagement clip connected to the body panel of the vehicle and at least one engagement arm connected to the engagement clip, the at least one engagement arm having an inwardly facing protrusion adapted to connect with the indentation of the mounting portion as the mounting portion slides into an installed position.

BRIEF DESCRIPTION OF THE DRAWINGS

FIG. 5 illustrates an exploded, cross-sectional and perspective view of the attachment assembly having engagement arms from a top view;

FIG. 6 illustrates a partially assembled perspective view of the engagement clip and mounting portion of the trim piece;

DETAILED DESCRIPTION OF THE INVENTION

An assembly for attaching a trim piece to a vehicle body panel is shown in FIGS. 4-9. The assembly includes a trim piece having a mounting portion, an engagement clip having a pair of engagement arms where the engagement arms include inwardly facing protrusions configured to connect with a pair of corresponding indentations on the mounting portion.

The assembly is provided for an improved attachment assembly for attaching a trim piece 110 to a vehicle body panel (or vehicle roof) 104 by increasing the retention force required to remove the trim piece. The assembly is slidably installed thus allowing for larger dimensions of the connection portions thereby increasing the retention force required to remove the trim piece. An engagement clip 120 is providing having a pair of engagement arms 134, 136 operable to slidably connect with a mounting portion 112 connected to the trim piece.

Figure 2:
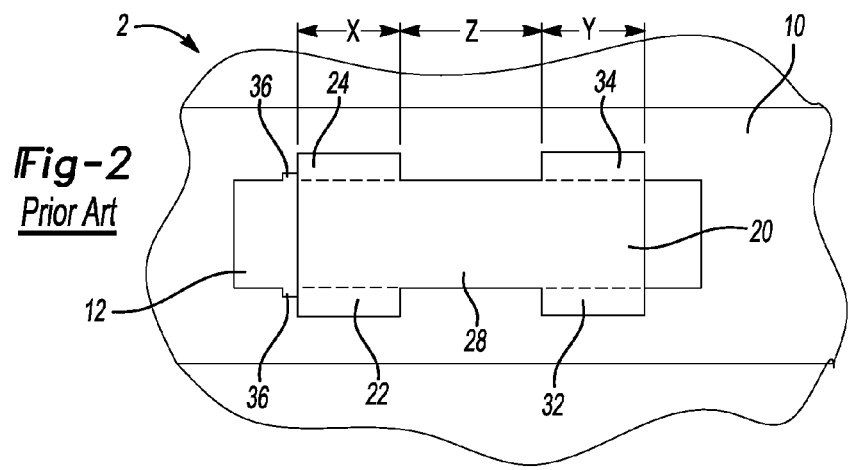
FIG. 2 illustrates a clip and trim assembly of the prior art.
Figure 3:
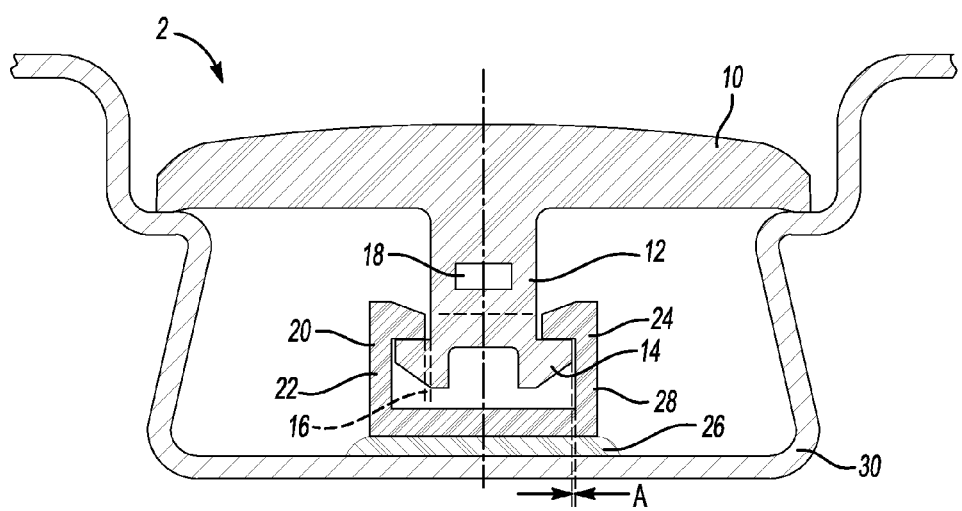
FIG. 3 illustrates a cross-sectional view of the trim assembly and corresponding engagement clip of the prior art.

FIGS. 2 and 3 illustrate the attachment assembly of the prior art. The prior art requires the trim assembly 10 to be press fit into place over and into the engagement clip 20. An assembly 2 includes a trim portion 10 having a mounting portion 12. The mounting portion 12 is integrally formed to a lower surface of the trim piece 10. An engagement portion 14 of the mounting portion 12 is provided connected to the mounting portion 12. The engagement portion 14 is operable to connect with an engagement clip. A corresponding engagement portion 16 is also provided. Metal support 18 may further be provided. An engagement clip 20 is provided having opposed side walls 22, 24. The engagement clip 20 includes a lower surface connected to an adhesive 26 to connect the engagement clip 20 to a vehicle body panel. The adhesive 26 connects to a lower portion 28 of the engagement clip 20. The engagement clip 20 connects to the vehicle body panel 30 of the vehicle.

The prior art requires the trim assembly 10 to be press fit into place over and into the engagement clip 20. The trim piece 10 is installed perpendicular to the engagement clip 20 by pressing the trim piece into the engagement clip. However, the retention force of the trim piece installed in this manner is limited to the insertion force and may not have enough retention force to prevent the molding from becoming disengaged.

Figure 1:
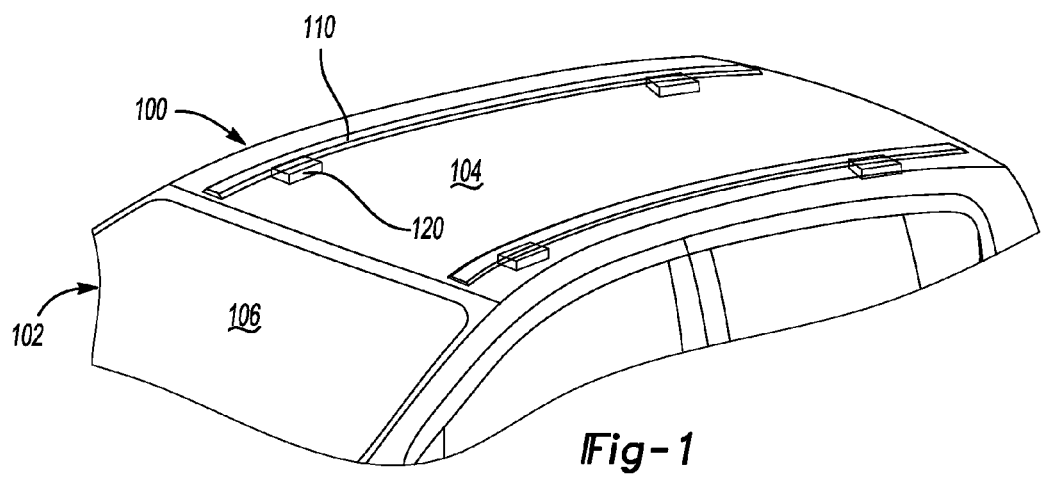
FIG. 1 illustrates a perspective environmental view of the positioning of the attachment features for the trim assembly.

FIG. 2 illustrates the assembly 2 having the trim piece 10 in the mounting portion 12. The engagement clip 20 is provided having a plurality of side walls 22, 24, 32, 34 adapted to hold the mounting portion 12 into place. However, the side walls 22, 24, 32, 34 are short thus further decreasing the retention capability of the engagement clip 20. Furthermore, the mounting portion 12 includes two protrusions 36. The protrusions 36 are intended to be locators during insertion of the trim piece into the engagement clip 20. However, the engagement clip 20 frequently moves over the protrusions 36 thus misaligning the trim piece 10. Misalignment of the trim piece 10 over the protrusions facilitates unwanted removal of the trim piece 10 from the engagement clip 20. FIGS. 1 and 4-9 illustrate an improved attachment assembly for mounting a trim piece to a vehicle body panel. FIG. 1 illustrates the vehicle 100 having a front portion 102 and a roof 104. The vehicle 100 further includes a windshield 106. The trim piece 110 is installed onto the roof 104. The engagement clip 120 is provided adhered to the roof 104 of the vehicle 100.

The improved attachment assembly further includes a tapered mounting portion connected to a trim piece operable to slidably connect with an engagement clip having at least one engagement arm. The engagement arm connects to at least one indentation located on the mounting portion. The mounting portion is integrally formed with the trim piece. An attachment assembly of the present assembly provides for an increased interference by adding 2 millimeters to the cross section of the clip and increasing the length of the clip by at least 9 millimeters. These changes to the engagement clip require the assembly to be slid into place thereby activating the engagement arms and securely connecting them to the indentations of the mounting portion. The engagement arms are flexible and resilient and include a pair of inwardly facing projections operable to connect with the indentations on the mounting portion.

Figure 4:
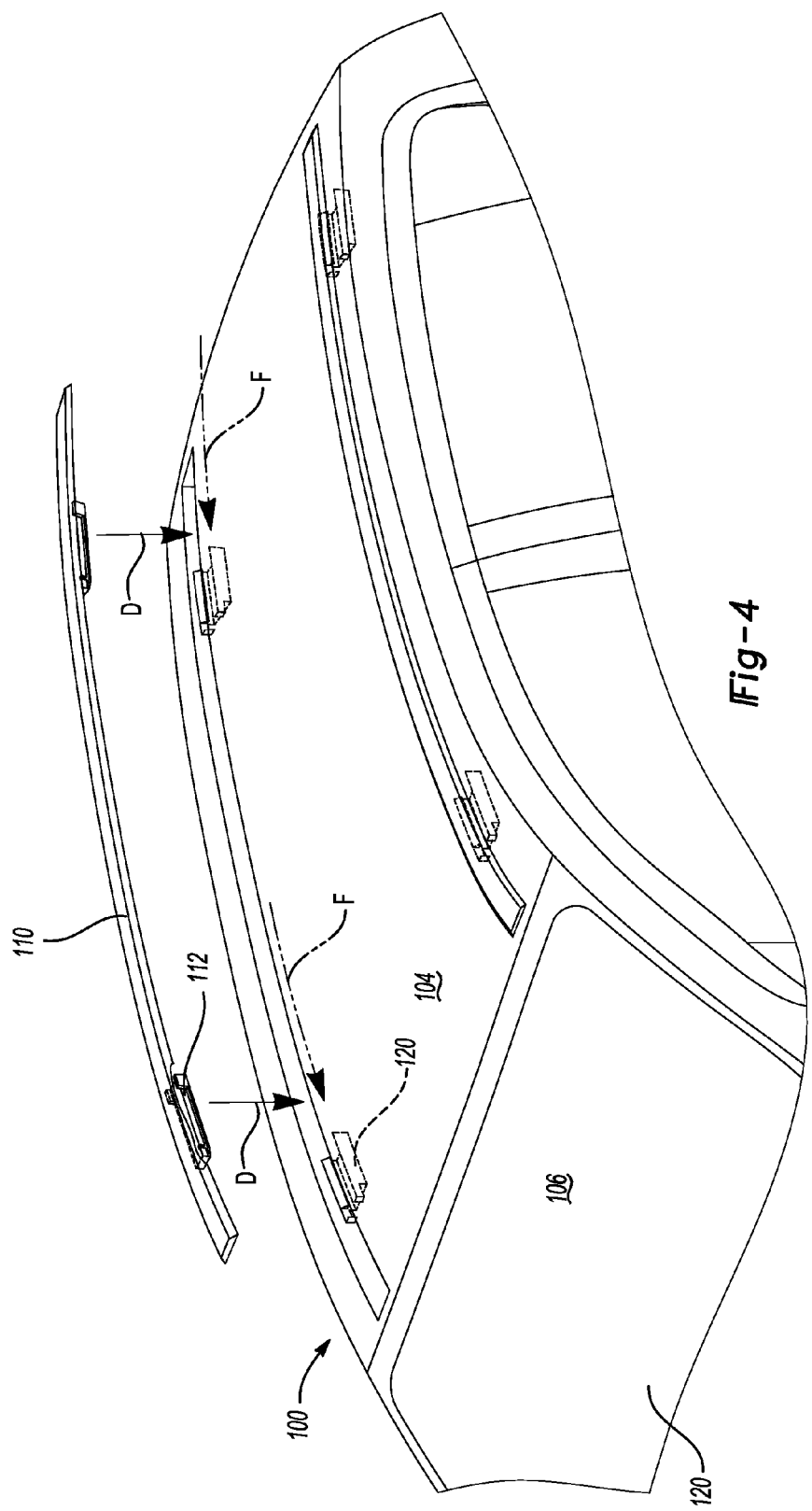
FIG. 4 illustrates an environmental view of the trim and attachment assembly in motion.

FIG. 4 illustrates movement of the method of installation of the trim piece 110. The trim piece 110 having the mounting portion 112 is installed into the engagement clip 120 by means of a downward and forward force by the installer. The attachment structure of the previous prior art assembly requires a downward force towards the vehicle roof 104 and a forward force F to slide the mounting portion 112 and secure the trim piece 110 into the engagement clip 120.

Figure 7:
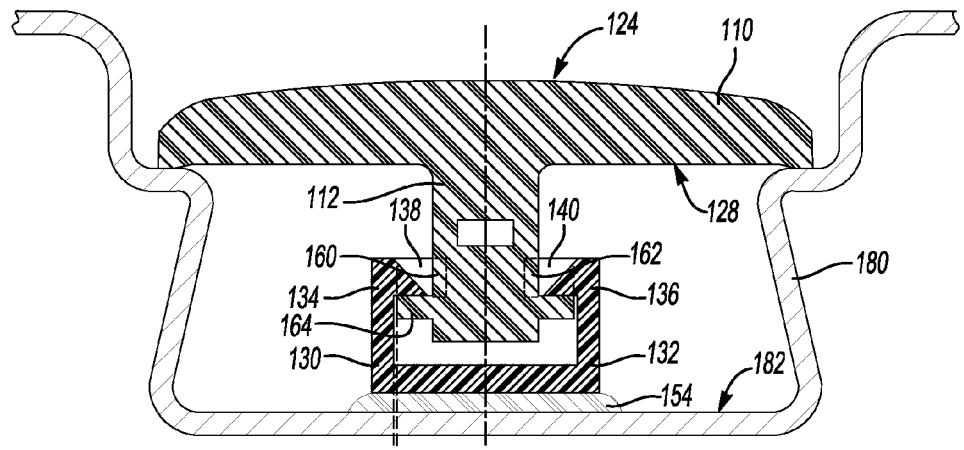
FIG. 7 illustrates a cross-sectional view of the trim piece and attachment assembly.

The trim piece 110 includes the mounting portion 112. The mounting portion 112 is integrally formed onto a lower surface 128 of the trim piece. The mounting portion 112 may be molded together with the trim piece 110 or the mounting portion 112 may be later installed securely onto the lower surface 128 of the trim piece 110. The trim piece 110 further includes an upper surface 124 viewable by the user of a vehicle from the exterior of the vehicle. The mounting portion 112 further includes indentations 160, 162 adapted to connect with a pair of engagement arms 134, 136 of the engagement clip 120. The mounting portion 112 further includes an elongated projection 164 adapted to rest adjacent to the projection 166 of the engagement clip 120. The projections 164, as illustrated in FIG. 7, are significantly longer as compared to the prior art thereby increasing the retention force required for removal of the trim piece 110 from the engagement clip. Comparing FIG. 3 of the prior art with FIG. 7 of the present embodiment, the dimensions A as compared to the dimensions B vary dramatically. In the present embodiment, the dimension B is at least 2 millimeters less than the dimension A thereby dramatically increasing the retention force required for removing the trim piece 110.

The mounting portion 112 further includes a first end 150 having a tapered portion 154. The tapered portion 154 is adapted to assist and facilitate in installation of the sliding of the mounting portion 112 into the engagement member 120.

The engagement clip 110 further includes engagement arms 134, 136. The engagement arms 134, 136 are resilient and flexible operable to slidably connect to the indentations 160, 162 of the mounting portion 112. The engagement arms 134, 136 each include inwardly facing projections 138, 140 which securely connect to the indentations 160, 162. The geometry of the inwardly facing projections 138, 134 is adapted to match with the geometry of the indentations 160, 162. This creates a secure connection and lock between the mounting portion 112 and the engagement clip 120. The engagement clip 120 is adapted to mount to a vehicle body panel 180. The vehicle body panel 180 includes a first surface 182 located within a channel. The engagement clip 120 connects to the surface 182 of the vehicle body panel 180 by means of an adhesive 184. The adhesive 184 may be a glue or any other suitable material strong enough to hold the engagement clip 120 to the vehicle body panel 180.

FIG. 6 illustrates an underside view of the engagement clip 120 connected to the mounting portion 112 with the trim piece 110 removed. Surface 142 illustrates the connection portion of the mounting portion 112 to the trim piece 110. The trim piece 110, in this figure, has been removed for illustrative purposes only. The mounting portion 112 includes a surface 126 which is spaced apart or connected to the lower surface 128 of the trim piece 110. The mounting portion 112 further includes a first end 150 and a second end 152. As previously discussed, the first end 150 includes a tapered portion 154 to assist in the slidable installation of the mounting portion 112 into the engagement clip 120. FIG. 6 further illustrates the side walls 132, 130 of the engagement clip 120. In the present embodiment, the side walls 130, 132 are uninterrupted and complete from a first end where the engagement arms 134, 136 are located to a rear end 155. In comparison to FIG. 2 of the prior art, the side walls are continuous (versus the uncontinuous walls as shown in FIG. 2 of the prior art) thereby further increasing the retention force required for removal of the trim piece 110 from the engagement clip 130. Again in comparison with FIG. 2 and also in view of FIG. 9, the present assembly adds at least 9 millimeters to the side walls 130, 132 of the engagement clip thereby significantly increasing the retention force required for removal of the trim piece 110 from the engagement clip 120.

Figure 8:
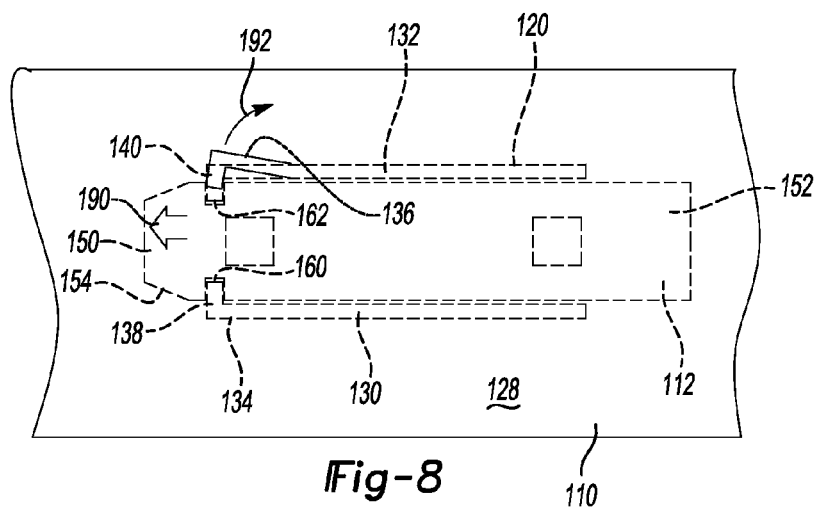
FIG. 8 illustrates a top view with phantom of the attachment assembly and trim piece.
Figure 9:
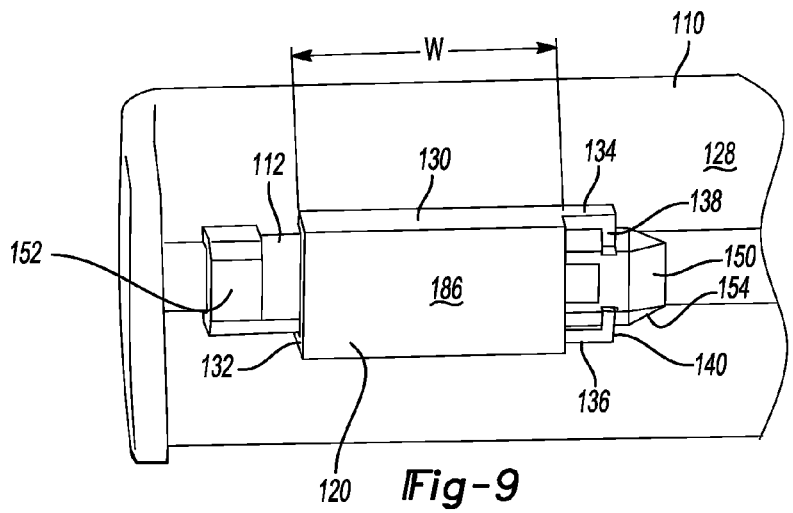
FIG. 9 illustrates a bottom view of the attachment assembly and trim piece before installation of the clip to the vehicle body panel.

FIG. 8 illustrates movement of the engagement arms 134, 136 and the inwardly facing projections 138, 140 of the present embodiment. As the trim piece and mounting portion 112 are slid into the engagement clip 120, and as the first end 150 of the mounting portion 112 approaches the engagement arms 134, 136, the engagement arms are forced outwardly to accommodate the mounting portion 112. This movement is illustrated by directional arrow 192. The engagement arms 134, 136 are flexible enough to accommodate the movement as illustrated by directional arrow 192. As the mounting portion 112 slides to a locked position, and as the engagement arms 134, 136 and corresponding inwardly facing projections 138, 140 approach the indentations 160, 162 of the mounting portion, the inwardly facing projections 138, 140 snap into the indentations 160, 162 thereby locking the mounting portion 112 into the engagement clip 120. Directional arrow 190 illustrates the forward movement of the mounting portion 112 into the locked position.

A trim assembly for attachment to a body panel of a vehicle including a trim piece having an inner surface, a mounting portion connected to the inner surface, the mounting portion having at least one indentation, an engagement clip adapted to securely connect to the mounting portion of the trim piece, the mounting portion adapted to slide into the clip into a secured portion, the engagement clip connected to the body panel of the vehicle and at least one engagement arm connected to the engagement clip, the at least one engagement arm having an inwardly facing protrusion adapted to connect with the indentation of the mounting portion as the mounting portion slides into an installed position. The mounting portion includes a first and an opposite second end, the first end of the mounting portion is tapered to facilitate sliding of the mounting portion into the clip, the mounting portion is tapered at the first end of the mounting portion.

The clip may include at least one unbroken side wall operable to engage with the mounting portion. The clip further includes two total engagement arms. The mounting portion includes two total indentations adapted to connect with the two engagement arms of the clip. The engagement clip includes an internal surface, the internal surface having an elongated projection. The mounting portion includes an elongated projection, the elongated projection of the mounting portion adapted to mount adjacent the elongated projection of the engagement clip in an assembly position so as to increase retention force for removal of the trim piece. The assembly is mounted within a channel on the roof of the vehicle.

The engagement arms of the engagement clip are flexible so as to facilitate bending during installation. Further, the mounting portion may be integrally formed with the trip piece. A lower surface of the engagement clip is adhered to the vehicle body panel. The engagement arms extend away from the engagement clip, the engagement arms extend generally perpendicularly away from the engagement clip. Further, the engagement arms may be formed as a one piece construction with the engagement clip. The mounting portion is formed as a one piece construction with the trip piece. The mounting portion is made of the same material as the trim piece.

A method of installation by slidably connecting a mounting portion to an engagement clip of the trim assembly is also provided for use with the assembly as discussed above. Such an assembly includes the engagement clip having a pair of engagement arms and the mounting portion having a pair of corresponding indentations, the method comprising the steps of inserting a tapered portion of a mounting portion into an opening in the engagement clip, sliding the mounting portion into the engagement clip, sliding the mounting portion through the engagement arms of the engagement clip so as to flex the engagement arms away from the mounting portion, connecting the engagement arms of the engagement clip with the corresponding indentations of the mounting portion by snapping the engagement arms of the engagement clip into the indentations of the mounting portion. The engagement arms further include a pair of inwardly-facing protrusions adapted to connect with the indentations of the mounting portion, connecting the inwardly-facing protrusions of the engagement clip with the corresponding indentations of the mounting portion by snapping the inwardly-facing protrusions of the engagement clip into the indentations of the mounting portion.

The invention is not restricted to the illustrative examples and embodiments described above. The embodiments are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the appended claims.

The invention claimed is:

1. A trim assembly for attachment to a body panel, the trim assembly mounted within a recessed portion of a vehicle roof, the trim assembly comprising:
   a trim piece having a mounting portion projecting away from an underside surface of said trim piece, said mounting portion having at least one indentation; and
   an engagement clip mounted to the vehicle roof, the engagement clip having a first end and a second end, a continuous wall extending between the first end and the second end; said engagement clip adapted to connect to said mounting portion of said trim piece, said mounting portion adapted to slide into said engagement clip, the continuous wall having an inner surface extending between the first end and the second end, an elongated projection extending away from the inner surface and continuously between the first end and the second end;
   at least one engagement arm connected to said engagement clip at the first end, the at least one engagement arm having an inwardly facing projection connecting with said at least one indentation of said mounting portion as the mounting portion is displaced into the installed position.

2. The trim assembly of claim 1 wherein said mounting portion includes a first and an opposite second end.

3. The trim assembly of claim 2 wherein said first end of said mounting portion is tapered to facilitate sliding of the mounting portion into said engagement clip.

4. The trim assembly of claim 2 wherein said mounting portion is tapered at the first end of said mounting portion.

5. The trim assembly of claim 1 wherein said engagement clip includes total continuous walls operable to engage with the mounting portion.

6. The trim assembly of claim 1 wherein said clip includes two total engagement arms.

7. The trim assembly of claim 6 wherein said mounting portion includes two total indentations adapted to connect with said two engagement arms of said engagement clip.

8. The trim assembly of claim 1 wherein said mounting portion includes an elongated projection, said elongated projection of said mounting portion adapted to mount adjacent said elongated projection of said engagement clip in an assembly position so as to increase retention force for removal of said trim piece.

9. The trim assembly of claim 1 wherein said assembly is mounted within a channel on the roof of the vehicle.

10. The trim assembly of claim 6 wherein said engagement arms of the engagement clip are flexible so as to facilitate bending during installation.

11. The trim assembly of claim 1 wherein said mounting portion is integrally formed with said trim piece.

12. The trim assembly of claim 1 wherein a lower surface of said engagement clip is adhered to the vehicle body panel.

13. The assembly of claim 6 wherein said engagement arms extend away from the engagement clip.

14. The assembly of claim 13 wherein said engagement arms extend generally perpendicularly away from the engagement clip.

15. The assembly of claim 13 wherein said engagement arms are formed as a one piece construction with the engagement clip.

16. The assembly of claim 1 wherein said mounting portion is formed as a one piece construction with the trim piece.

17. The assembly of claim 1 wherein said mounting portion is made of the same material as said trim piece.

18. A method for installing the trim assembly of claim 6, the method comprising the steps of:
   mounting the engagement clip to the recessed portion of a vehicle body panel,
   inserting a tapered portion of the mounting portion into an open portion in the engagement clip;
   displacing the mounting portion through a channel of the engagement clip so as to flex the engagement arms away from the mounting portion; and
   connecting the engagement arms of the engagement clip with a pair of corresponding indentations in the mounting portion by snapping the engagement arms of the engagement clip into the indentations of the mounting portion.

19. The method of installation of claim 18 further comprising the step of connecting the inwardly-facing projections of the engagement clip with the corresponding indentations of the mounting portion by snapping the inwardly-facing protrusions of the engagement clip into the indentations of the mounting portion.

* * * * *